3 Sheets--Sheet 3.

H. WINFIELD & W. P. FLYNN.
Cultivator.

No. 168,074. Patented Sept. 21, 1875.

WITNESSES
George E. Uphail
John B. Corliss

INVENTORS
Henry Winfield
Wm. P. Flynn
Chipman Hosmer & Co,
ATTORNEYS

UNITED STATES PATENT OFFICE.

HENRY WINFIELD AND WILLIAM P. FLYNN, OF PANTEGO, NORTH CAROLINA.

IMPROVEMENT IN CULTIVATORS.

Specification forming part of Letters Patent No. 168,074, dated September 21, 1875; application filed June 5, 1875.

*To all whom it may concern:*

Be it known that we, HENRY WINFIELD and WILLIAM P. FLYNN, of Pantego, in the county of Beaufort and State of North Carolina, have invented a new and valuable Improvement in Cotton-Cultivators; and we do hereby declare that the following is a full, clear, and exact description of the construction and operation of the same, reference being had to the annexed drawings, making a part of this specification, and to the letters and figures of reference marked thereon.

Figure 1:
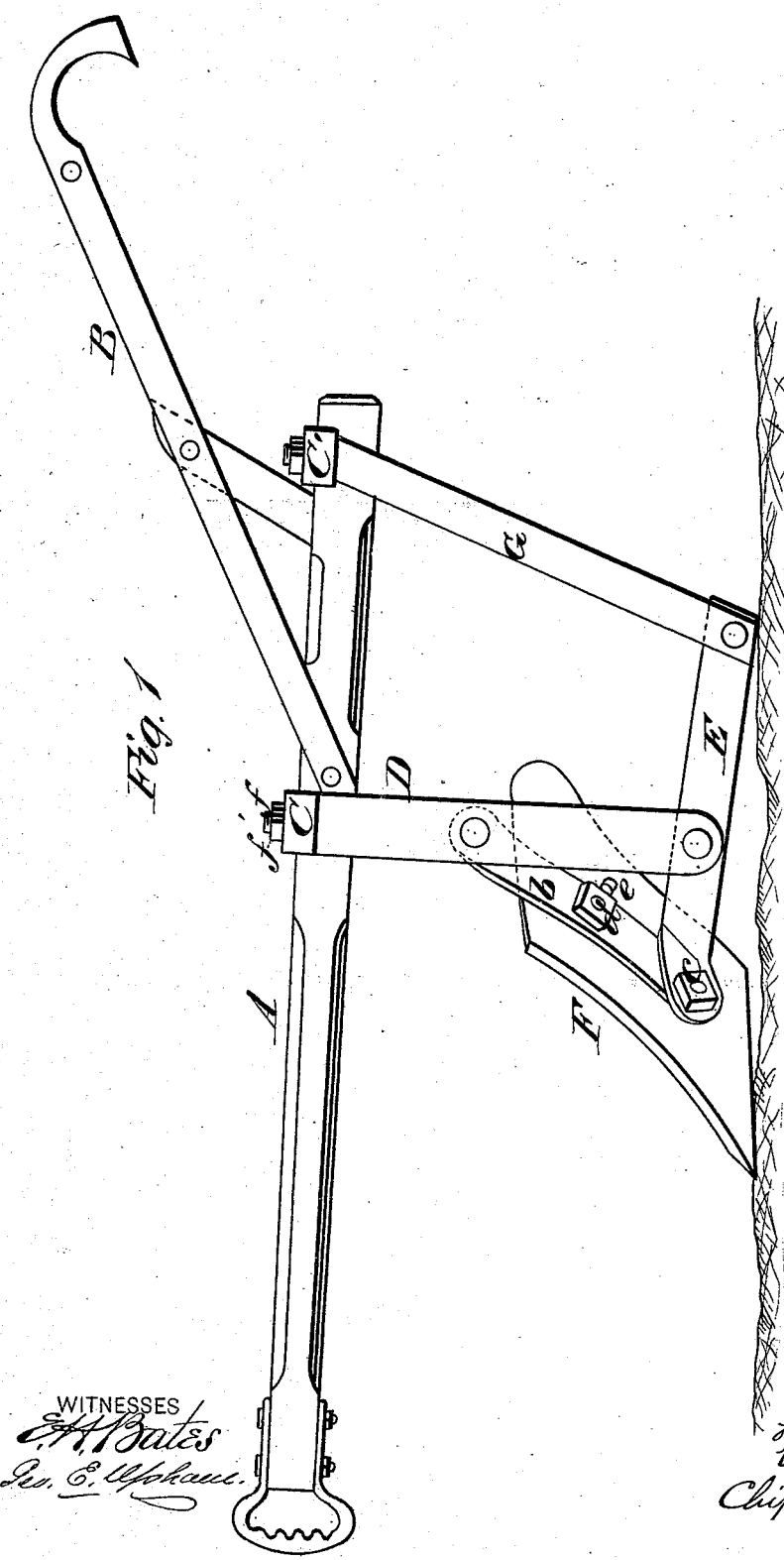
Figure 2:
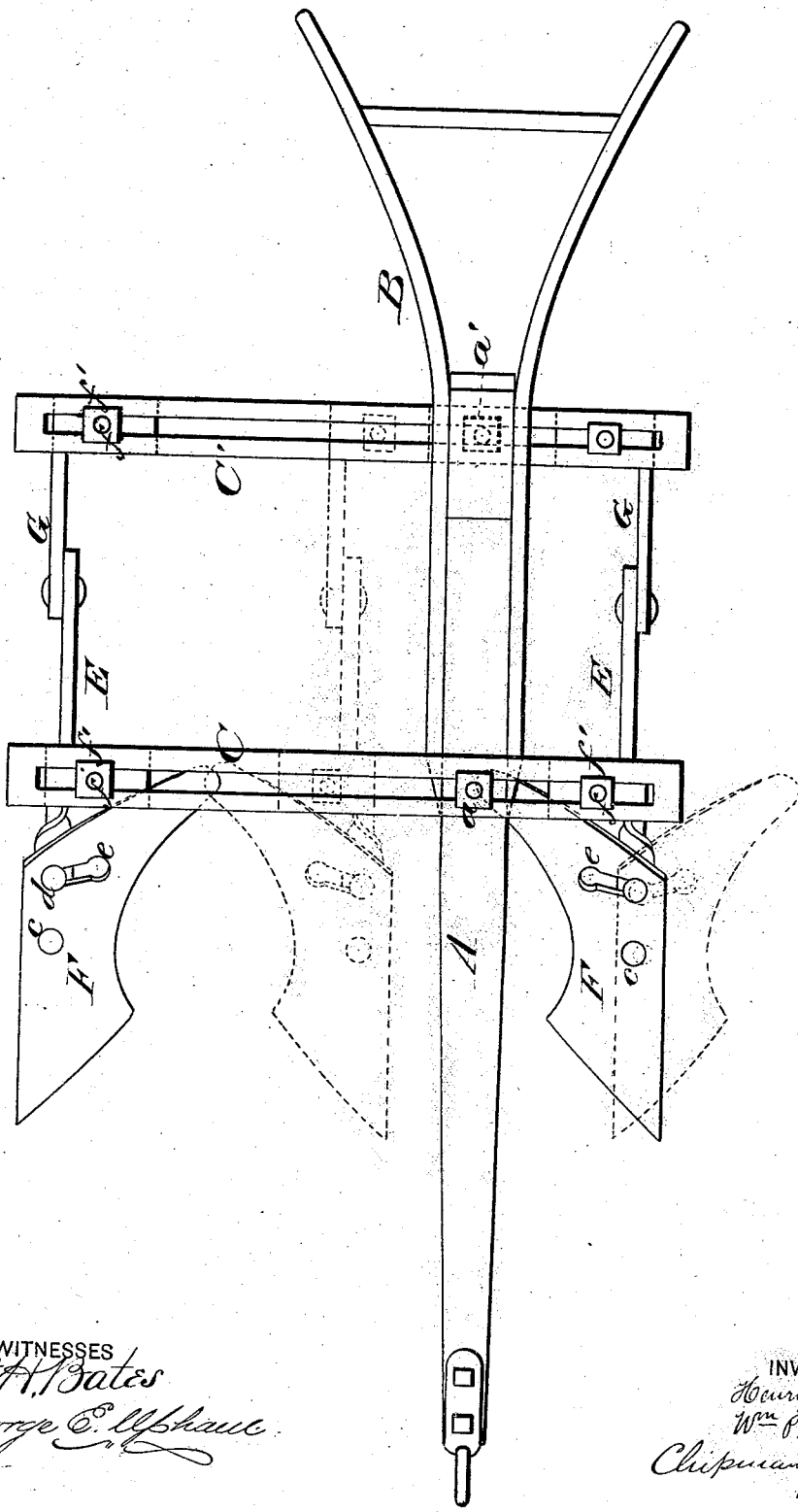
Figure 3:
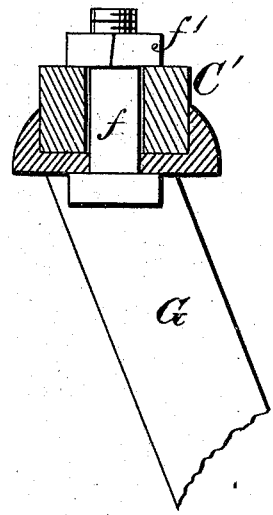
Figure 4:
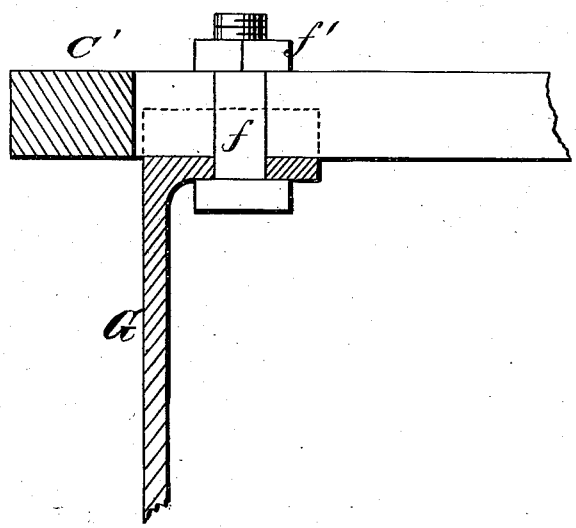
Figure 5:
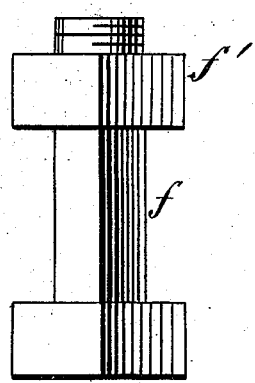
Figure 6:
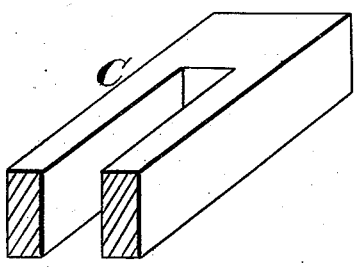

Figure 1 of the drawings is a representation of a side elevation of our cotton-cultivator, and Fig. 2 is a plan view of the same. Figs. 3, 4, 5, and 6 are detail views.

This invention has relation to implements which are designed for cultivating cotton; and it consists in certain improvements in cotton-cultivators, which will be hereinafter more fully set forth.

In the annexed drawing, A designates the beam of our improved cultivator, to which handles B are rigidly secured. C C' designate two slotted bars, which are arranged parallel to each other, and are secured, by bolts and nuts $a$ $a'$, to the beam A at right angles thereto, as shown in Fig. 2. By loosening the nuts and bolts $a$ $a'$, the slotted bars C C' can be adjusted in a direction with their length. In order to secure greater rigidity of the bars C C', they are let into the beam A nearly flush with its upper surface. D D designate standards, to which sole-bars E E and strap-braces $b$ $b$ are rigidly secured, to which latter the shovels F F are adjustably attached by means of pivot-bolts $c$ and bolts $d$, which latter pass through oblong slots $e$, made through the upper portions of the shovels. By loosening the bolts $d$ the shovels can be adjusted about their pivots $c$, so as to run deeper or shallower, as circumstances require.

The upper end of each standard D is bent at right angle to the vertical portion thereof, and perforated to receive through it a bolt, $f$, which bolt is passed through the slot in bar C, and confined by a nut, $f'$. This holds the standard rigidly to the bar C, and by loosening the nut $f'$ the standard can be adjusted and set at any desired point on the bar.

The rear end of each sole-bar E is rigidly secured to the lower end of an inclined brace, G, which is adjustably but rigidly secured to the rear slotted bar C' in the same manner as the standards are secured to their bar C. The braces G and their sole-bars E resist backward strain on the shovel-standards.

It will be seen from the above description that the two slotted bars C C' are endwise adjustable by simply loosening the nuts which hold them to the draft-beam, and that the two shovel-standards are adjustably attached to said bars. This allows the bars C C' to be adjusted on the beam A, so that a single horse can be used for drawing the implement, or the bars can be adjusted so that two horses can be used.

When a single horse is used, and the shovels are adjusted as shown in full lines, Fig. 2, the animal will walk in the channel on one side of a row of plants; and if it is found that the shovel farthest from the beam A dips too deeply into the soil, owing to a preponderance of one part of the bar or bars over the other, all the nuts of both bars C C' are loosened, and these bars are adjusted endwise until a proper balance is obtained, after which the nuts are tightened.

The full lines in Fig. 2 indicate the shovels adjusted for turning the earth toward the roots of the plants, and the dotted lines indicate the shovels adjusted for turning the earth from the plants.

What we claim as new, and desire to secure by Letters Patent, is—

In a cotton-cultivator, the slotted bars C C', laterally adjustable on the beam A, in combination with the standards D G, with shovels F adjustable in the slots of the bars C C', substantially as and for the purpose set forth.

In testimony that we claim the above we have hereunto subscribed our names in the presence of two witnesses.

HENRY WINFIELD.
      WILLIAM P. FLYNN.

Witnesses:
 JOS. B. LOOMIS,
 GEORGE E. UPHAM.